United States Patent [19]

Takigawa

[11] Patent Number: 5,263,257

[45] Date of Patent: Nov. 23, 1993

[54] PRUNING SAW

[75] Inventor: Shigetsugu Takigawa, Osaka, Japan

[73] Assignee: ARS Edge Co., Ltd., Osaka, Japan

[21] Appl. No.: 868,398

[22] Filed: Apr. 14, 1992

[51] Int. Cl.⁵ .............................................. B23D 51/01
[52] U.S. Cl. ........................................ 30/517; 30/514
[58] Field of Search ............. 30/501, 502, 503, 503.5, 30/514, 517, 518, 519, 520, 144

[56] References Cited

U.S. PATENT DOCUMENTS

| | | | |
|---|---|---|---|
| 246,030 | 8/1881 | Mioberg | 30/514 |
| 2,552,652 | 5/1951 | Stasiek | 30/501 |
| 2,722,244 | 11/1955 | Schultz | 30/514 |
| 3,404,456 | 10/1968 | Chilko | 30/514 |
| 4,270,588 | 6/1981 | Neft | 30/501 |

Primary Examiner—Douglas D. Watts
Assistant Examiner—Hwei-Siu Payer
Attorney, Agent, or Firm—James A. Wong

[57] ABSTRACT

Herein disclosed is a pruning saw which comprises: a saw blade (1); a grip sheath (3) having a blade guide hole (2) extending therethrough in the longitudinal direction thereof for guiding the saw blade (1) slidably; and a handle (4) positioned at the back of the grip sheath (3) and extending from the saw blade (1), the saw blade (1) being so inserted into the blade guide hole (2) that it can be pushed and pulled therein. Further comprised is an object holder (6) which is disposed at a suitable spacing from and generally in a position opposed to the saw blade (1) for holding an object (7) between itself and the saw blade (1) when in the pruning operation.

6 Claims, 2 Drawing Sheets

PRUNING SAW

BACKGROUND OF THE INVENTION

1. Field of the Invention

The present invention relates to a pruning saw for cutting mainly branches of a tree by pushing or pulling it.

2. Prior Art

The saw of this type is exemplified in the prior art not by any special one but by an ordinary saw which is constructed by attached a handle to a saw blade made of a thin steel plate and formed with a number of teeth.

In case a branch of a tree is to be pruned by such saw composed merely of the saw blade and the handle, an object to be cut or the branch is swung in accordance with the pushing and pulling actions of the saw. Even if a sufficient force is elaborately applied to the saw, it is not transmitted reliably and effectively to the branch. Even if a substantially immovable branch close to the trunk of the tree is to be pruned, the saw will also swing normal to the cutting plane as it is reciprocated. The cut face naturally has rough undulations, and the saw blade warps as much chip is produced so that the cutting resistance is augmented to obstruct the smooth pruning operation.

SUMMARY OF THE INVENTION

An object of the present invention is to provide a pruning saw which can transmit a cutting force reliably and effectively thereto and can smoothen the cutting operation without any warp or break even with a thin blade by blocking the transverse swing normal to the cutting plate thereby to reduce the cutting resistance.

According to a feature of the present invention, the saw blade is guided to be pushed and pulled through a grip sheath, and an object to be cut is held between the saw blade and an object holder which is disposed at a suitable spacing from and generally at a position opposed to the saw blade.

DETAILED DESCRIPTION OF THE INVENTION

Figure 1:
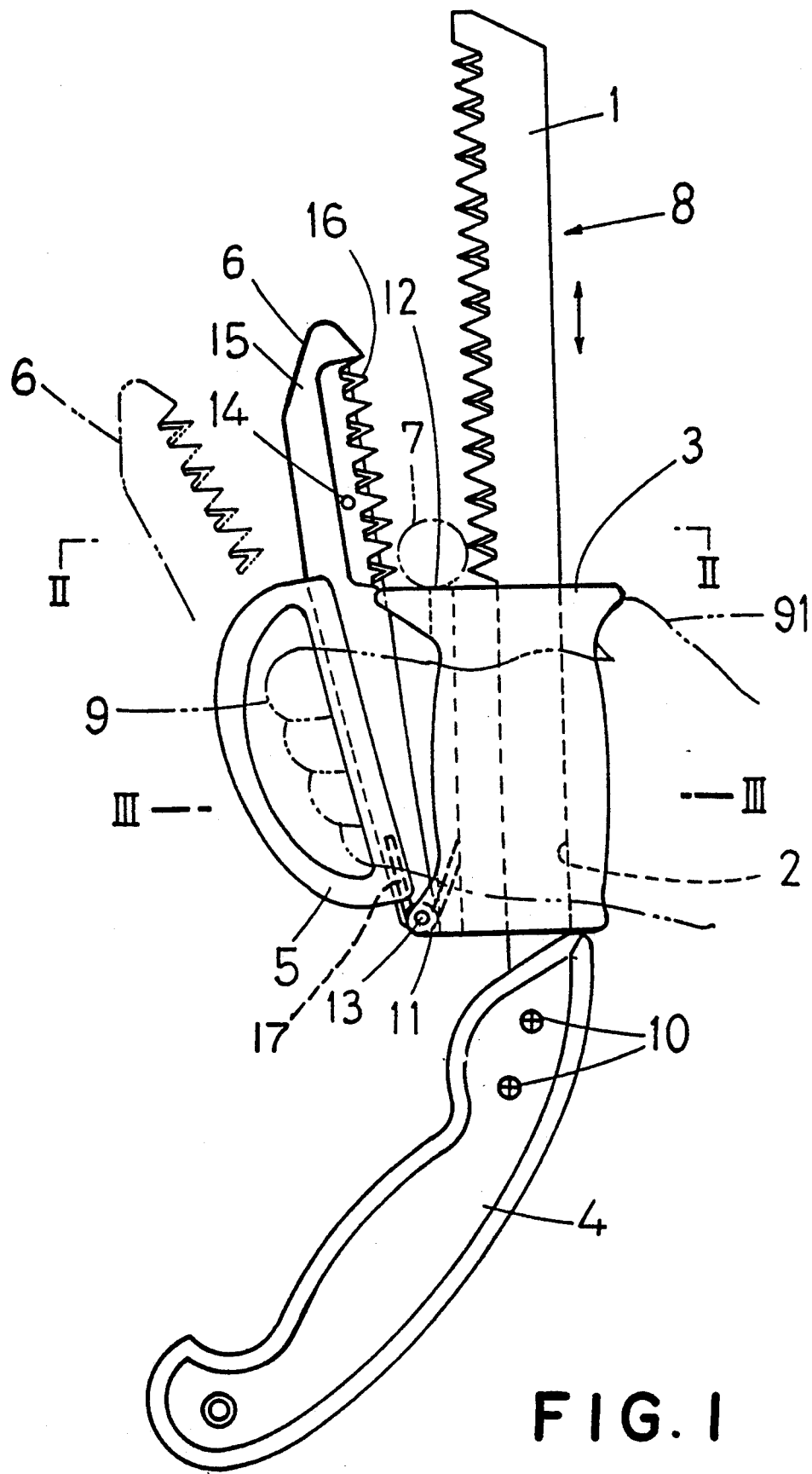
FIG. 1 is a front elevation showing the whole structure of a pruning saw according to the present invention.

A pruning saw according to the present invention comprises: a saw blade 1; a grip sheath 3 having a blade guide hole 2 extending therethrough in the longitudinal direction thereof for guiding the saw blade 1 slidably; and a handle 4 positioned at the back of the grip sheath 3 and extending from the saw blade 1. The saw blade 1 is so inserted into the blade guide hole 2 that it can be pushed and pulled therein. Further comprised is an object holder 6 disposed at a suitable spacing from and generally in a position opposed to the saw blade 1 for holding an object 7 between itself and the saw blade 1 when in the pruning operation.

Here, the object holder 6 should not be especially limited if it can hold the object 7, but may preferably be made of a metal plate formed with a variety of knurls have wave, pulse or trapezoidal shapes.

When the pruning saw according to the present invention is to be used, the saw 8 is brought at first near the object 7 to clamp the object 7 between the saw blade 1 and the object holder 6. Then, the user grips the handle 4 at his one hand (ordinarily his righthand side) and the grip sheath 3 and the object holder 6 at his other hand, as indicated by double-dotted lines in FIG. 1, so that the object 7 may be so held between the saw blade 1 and the holder 6 as to come out.

If the saw blade 1 is then pushed and pulled along the blade guide hole 2, it is guided without any warp to cut the object 7 by the guide hole 2. As the cutting operation proceeds, the object 7 is gradually cut deeper and deeper with the saw blade 1 being always held in abutment against the upper edge of the guide hole 2, until the cutting operation is completed. As soon as this operation ends, the object 7 is automatically released from the held state of the saw blade 1 and the holder 6. Then, the reciprocations of the pruning saw 8 is stopped. If the grip sheath 3 and the holder 6 are then released from their gripped states, the saw 8 restores its original state.

As is now apparent from the description thus far made, according to the pruning saw of the present invention, the object to be cut is so fixed during the pushing and pulling actions of the saw as to be freed from any swinging motion, so that the force applied to the saw is transmitted reliably and effectively to the object.

Since, moreover, the saw blade is slid while being always guided along the guide hole of the grip sheath, it is prevented from any transverse swinging motion normal to the cutting plane of the object. As a result, the object can be sharply cut without any rough undulations on its cut face to minimize the hurt of the tree, and the cutting chip can also be minimized to reduce the cutting resistance. Still moreover, even a thin saw blade can smoothen the cutting operation without any warp or breakage.

As is different from the prior art, not only one end portion of the saw handle but the grip sheath in front of the handle is firmly gripped while the saw is being pushed and pulled, the more cutting force is added at the grip sheath so that the cutting operation can be improved better.

An embodiment of the present invention will be specifically described in the following with reference to the accompanying drawings.

Figure 2:
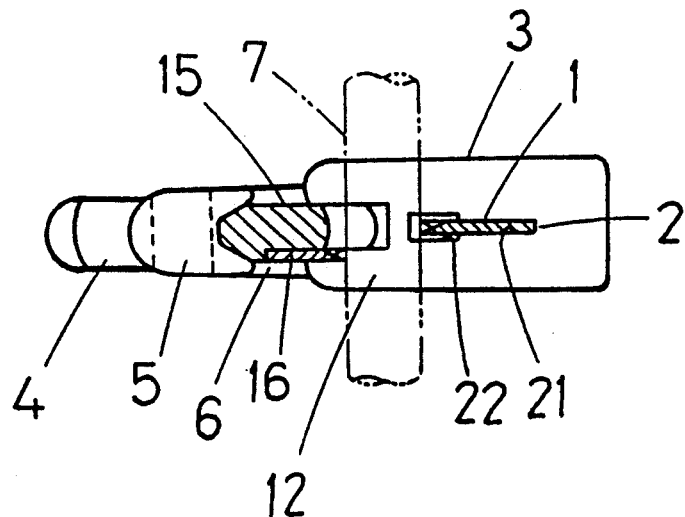
FIG. 2 is a section taken along line II—II of FIG. 1.
Figure 3:
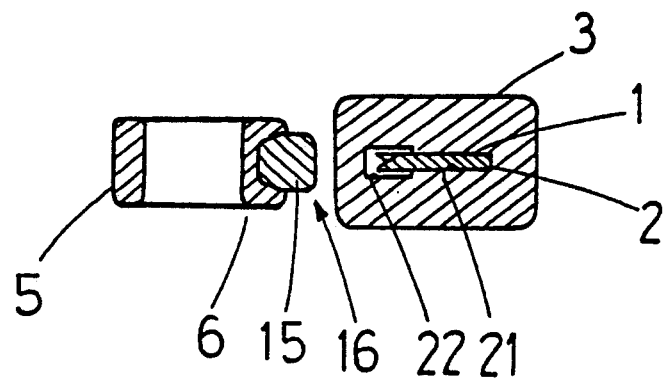
FIG. 3 is an end face taken along line III—III of FIG. 1.

In FIGS. 1 to 3 showing one embodiment of the pruning saw according to the present invention: FIG. 1 is a front elevation showing the whole structure of the pruning saw according to the present invention; FIG. 2 is a section taken along line II—II of FIG. 1; and FIG. 3 is an end view taken along line III—III of FIG. 1.

In these Figures, a pruning saw 8 according to the present invention is equipped with: a saw blade 1; a grip sheath 3 which is made of a hard synthetic resin having a generally rectangular section and which is formed therethrough in the longitudinal direction with a blade guide hole 2 capable of guiding the saw blade 1 slidably; and a handle 4 made of wood or a synthetic resin and so fastened to the saw blade 1 by means of screws 10 and 10 that it is positioned at the back of the grip sheath 3.

The saw blade 1 is formed of a guide portion having no tooth and extending to face generally the length of the guide hole 2, and a toothed portion projecting from the grip sheath 3. This toothed portion of the saw blade 1 to be inserted into the guide hole 2 is made so sufficient that the saw blade 1 may always face an object 7 when it is pushed and pulled (the length of the toothed portion of the blade 1 projecting to the front from the grip sheath 3 being exemplified by 20 cm in the present embodiment).

The blade guide hole 2 has its section formed of a thinner hole portion 21, which has a width substantially equal to or slightly wider than the thickness of the saw blade 1 so that it may allow the blade 1 to slide therein, and a thicker hole portion 22 which is formed to merge into the thinner hole portion 21. In other words, the blade guide hole 2 is formed to allow the toothed portion of the blade 1 to slide smoothly without any contact with the blade guide hole 2 when the saw blade 1 is pushed and pulled.

The grip sheath 3 is bifurcated from a hinge 11 to protrude slightly at the side of the toothed portion of the saw blade 1. An object holder 6 is hinged to the bifurcated hinge 11 by means of a pin 13. Specifically, the object holder 6 is composed of: a rod-shaped holder body 15 which is made of a hard synthetic resin; a clamper portion 16 which is made of a metal and formed with a number of teeth and which is fixed by means of a fixing pin 14 from a rather front portion of the holder body 15 to the leading end; and a grip 5 which is integrally fixed to the outer side of the holder body 15. This holder body 15 has its rear end hinged to the aforementioned bifurcated hinge 11 by means of the pin 13. In case the object 7 or a branch of a tree is to be held, the object holder 6 is moved at first away from the saw blade 1, as indicated by double-dotted lines in FIG. 1, and the object 7 is inserted into the gap between the grip sheath 3 and the object holder 6 until it comes into abutment against a bifurcated abutment 12 which is formed all over the face of the grip sheath 3. After this, the object 7 is clamped between the toothed portion of the saw blade 1 and the clamper 16 of the object holder 6 so that it may not come out from between the saw blade 1 and the object holder 6.

The aforementioned grip 5 has a slightly flattened annular shape which is sized to allow the four fingers 9 of the user. On the other hand, the grip sheath 3 has its outer periphery so smoothly curved as to allow the palm gripping it to follow. If a thumb 91 grips the outer periphery of the grip sheath 3 to grasp the grip 5 intensely together with the four fingers 9 fitted in the grip 5, the object 7 can be held by the saw blade 1 and the object holder 6. In this state, moreover, the other hand grips the handle 4 and pushes and pulls the saw blade 1 back and forth to cut the object 7. As this object 7 is cut, it is bitten by the blade 1 through the object holder 6 until the cutting of the object 7 is completed. If this cutting operation thus ends, the gripping force by the grip sheath 3 and the object holder 6 is released to swing the holder 6 back to the original position, as indicated by the double-dotted lines.

Figure 4:
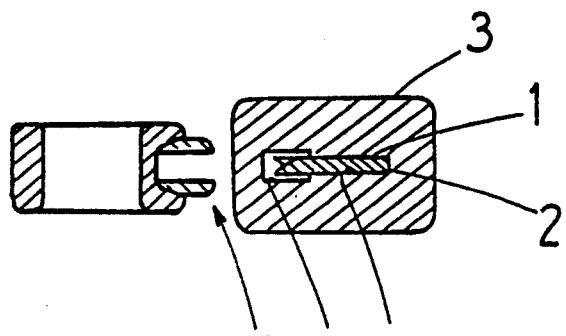
FIG. 4 is a view similar to FIG. 3 showing a clamper in the form of a pair of parallel blades.

Although the present invention has its embodiment presented hereinbefore, it could be modified in various manners without departing from the gist thereof. In the foregoing embodiment, for example, the object 7 is held by the gripping force of the fingers. However, the pin 13 may be wound with a spring 17, for example, to bias the object holder 6 to hold the object 7. As shown in FIG. 2, moreover, the saw blade 1 and the clamper 16 are opposed to each other with such a small offset as to prevent their collision. However, the clamper 16 may be composed of two toothed blades arranged in parallel relationship to each other as shown in FIG. 4 if necessary, so that the two blades may be faced by the saw blade 1 positioned inbetween.

I claim:

1. A pruning saw comprising: a saw blade (1) and a grip sheath (3) with a hole (2) extending therethrough, said saw blade (1) having a toothed sawing portion extending longitudinally from the front portion thereof and a toothless guide portion extending longitudinally from said toothed sawing portion and terminated at a rear portion of said saw blade and being slidably disposed within said hole (2) of said grip sheath (3); said hole (2) extending through said grip sheath (3) in the longitudinal direction thereof to slidably guide said saw blade (1); said grip sheath (3) also having an abutment face (12) for receiving an object (7) at the front end thereof and a handle (4) mounted on the rear portion of said saw blade (1); and an object holder (6) pivotably mounted on the grip sheath (3) and said object holder (6) having a clamper (16) facing said toothed portion for fixedly supporting the object (7) in cooperation with the saw blade (1) and the abutment face (12).

2. A pruning saw according to claim 1, wherein a grip (5) is provided on said object holder (6).

3. A pruning saw according to claim 1, wherein said object holder (6) is constantly compressed against the saw blade (1) through a spring means (17).

4. The pruning saw according to claim 1, wherein the blade guide hole (2) comprises a thinner portion (21) which has a width slightly wider than the width of the saw blade (1) and a wider portion (22) wider than said thinner portion (21).

5. The pruning saw according to claim 1, wherein the saw blade (1) and the clamper (16) are opposed to each other with such a small offset as to prevent their collision.

6. The pruning saw according to claim 5, wherein the clamper (16) is composed of a pair of toothed blades arranged in parallel and at regular intervals so that the saw blade (1) can enter therebetween.

* * * * *